Sept. 29, 1942.  P. DESERNO  2,297,393

BAND TRANSMISSION TESTING CIRCUIT

Filed Oct. 24, 1939  2 Sheets-Sheet 1

Inventor:
Peter Deserno
by E. D. Phinney
Att'y

Sept. 29, 1942.  P. DESERNO  2,297,393
BAND TRANSMISSION TESTING CIRCUIT
Filed Oct. 24, 1939  2 Sheets-Sheet 2
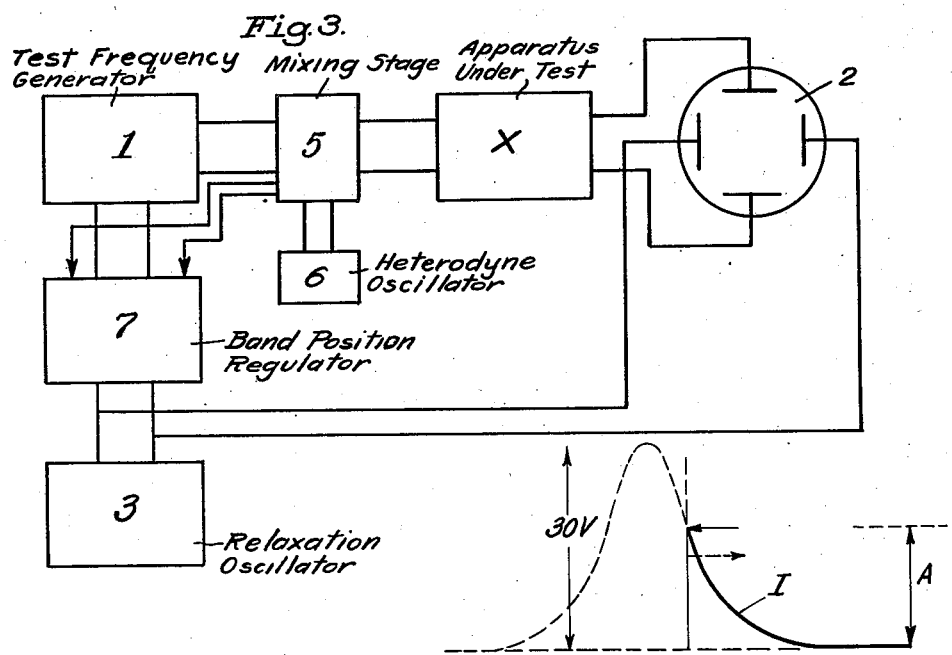
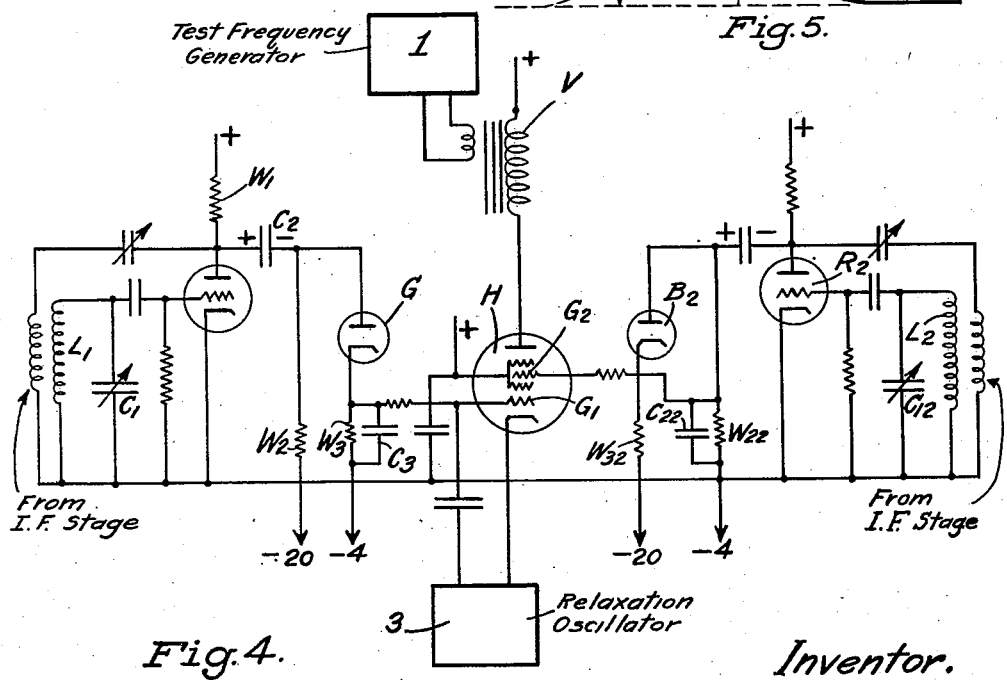
Inventor.
P. DESERNO
By E. D. Phinney
Attorney Patented Sept. 29, 1942

2,297,393

UNITED STATES PATENT OFFICE 2,297,393

BAND TRANSMISSION TESTING CIRCUIT

Peter Deserno, Berlin-Tempelhof, Germany;
vested in the Alien Property Custodian Application October 24, 1939, Serial No. 301,003
In Germany June 8, 1939

1 Claim. (Cl. 175—183)

According to a well established method of measuring the frequency characteristic of electrical transmission devices there is connected to the input of the transmission device to be tested, for example, an amplifier, an alternating current generator, the frequency and terminal voltage of which are adjustable, and the output potentials derived from the same input potentials of the particular testing frequency to which the generator is adjusted is tested. It has recently been suggested to use a continuous and periodically varying testing frequency, and to render the frequency curve of the transmission member to be tested directly visible on the luminous screen of a Braun tube.

Figure 1:
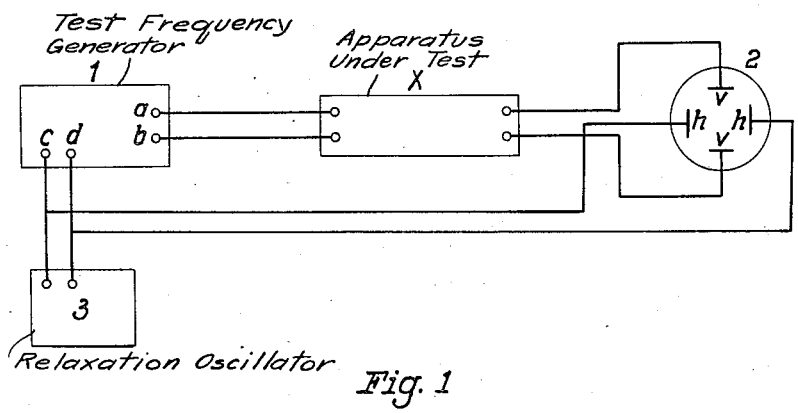
Figure 2:
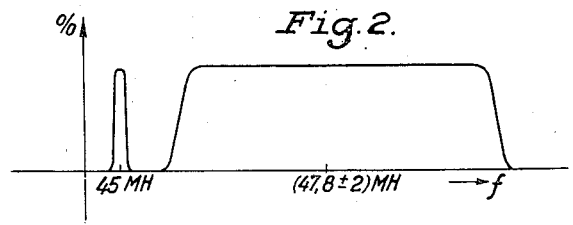
Figure 2A:
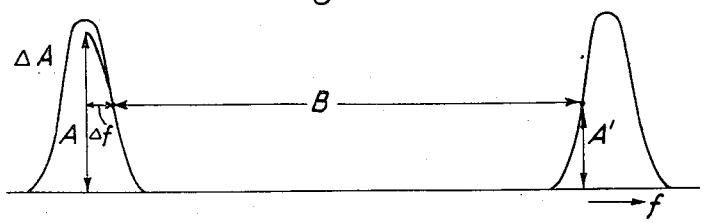

A more complete explantion of my invention is made in the particular description thereof, taken with the accompanying drawings in which Fig. 1 shows a proposed testing arrangement, Figs. 2 and 2A are curves used in explaining the principles of my invention, Fig. 3 is a diagram showing a preferred arrangement of circuits in accordance with my invention, Fig. 4 is a circuit diagram of the band regulator shown in Fig. 3, and Fig. 5 is a curve used to explain the operation of parts of Fig. 4.

Fig. 1 of the accompanying drawings shows a testing arrangement of this kind. In this 1 represents the testing frequency generator, 2 the deflecting system of a Braun tube, 3 a relaxation apparatus, for the generation of saw-tooth currents and potentials, and $x$ the transmission member of which the frequency characteristic is to be tested. The frequency determining oscillatory circuit of 1 contains a high frequency coil with a high frequency iron core, of which the premagnetisation can be varied by a special magnetising winding connected to the terminals $c$ and $d$. Since, as is well-known, the self-inductance of the high frequency coil with iron core within certain limits varied continuously with its premagnetisation, the testing frequency given from the testing generator 1 on the output terminals $a$ and $b$ is determined by the strength of the current supplied to the terminals $c$ and $d$. The frequency determining oscillatory circuit, for example, can be the turning circuit of an electron tube circuit with feed back. In the relaxation apparatus 3 by means of well-known electrical relaxation circuits saw-tooth currents are produced, for example, of the frequency 50 cycles per second. The saw-tooth current suitably connected to an ohmic resistance supplies the deflecting voltage for the horizontal deflection of the Braun tube 2, of which the vertical deflecting plates $v$ are on the output terminals of the transmission member to be tested. If, moreover, the magnetising coil of the testing frequency generator 1 be connected to the output terminals of the relaxation apparatus 3 through the terminals $c$ and $d$, then its frequency is continuously varied within certain limits in the rhythm of the relaxation oscillation, and thus so that the testing frequency becomes first of all slowly higher in accordance with the slow rise of current, and then the current relaxation rapidly returns to its initial value. By corresponding switching members in the testing frequency generator it can be obtained that the potential supplied from its output terminals is of the same magnitude at all frequencies of the pass range. If this testing potential periodically varying its frequency be conveyed over the transmission member $x$ to be tested to the vertical deflecting plates of the Braun tube, then the light ray shows on the luminous screen the frequency characteristic of $x$ as a continuous image, as the horizontal deflection in 2, and the frequency variation in 1 are synchronously effected by the same relaxation voltage. At the same (time) point the horizontal deflection always belongs to the same testing frequency while the vertical deflecting voltage is in proportion to the permeability of the transmission member $x$ for this testing voltage at any (time) point. If the horizontal coordinates are calibrated according to the frequency of the testing generator and the voltage coordinates in percentages permeability, or in degrees of amplification factor, then the frequency characteristic of $x$ can also be immediately numerically read on the luminous screen.

The premagnetisation of the high frequency iron core in the testing generator 1 is preferably effectively obtained in the well known manner by the fact that the magnetisation winding is arranged outside the high frequency coil on a core of ordinary magnetic sheet metal which is magnetically connected in series with the high frequency iron core. When employing the high frequency iron usual at the present time in this way a frequency variation of 40 to 50% can be obtained. Now, with the wide frequency bands necessary recently in the television art, this in particular is not sufficient when the intemediate carrier frequency is low in proportion to the highest modulation frequency. In order to investigate the intermediate frequency portion of a television receiver, for example, a band of 5 to 11 megacycles would have to be brushed; which corresponds to a frequency variation of 120% with reference to 5 megacycles.

It has been suggested that a frequency band of the requisite width might be produced by applying the heterodyne principle. Thereby the frequency of an ultra-short-wave transmitter—for example 44 megacycles—is varied by the desired band width (for example, six megacycles), and these oscillations are heterodyned with those of a second fixed (or also varying in the opposite direction) ultra short wave transmitter of, for example, 39 megacycles. In this way the desired intermediate frequency band of 5 to 11 megacycles is obtained.

An arrangement operating on this principle has, however, various drawbacks in practice. These mainly consist in the fact that the width and position of the frequency band which passes through the testing frequency is not constant. The shifting of the testing frequency has various causes. On the one hand it is caused by fluctuations of the two ultra-short wave generators. It is possible to keep the one generator constant by means of quartz control, but quartz control cannot be used with the other generator as its frequency is changed. A second cause of trouble is the premagnetisation. If the main value of the premagnetisation current and the amplitude of the relaxation current are not exactly constant, then the range traversed by the testing frequency is varied in position and width.

In order to overcome these drawbacks it is suggested in accordance with the invention automatically to adjust the range which the testing frequency passes through in position and width. The regulating voltage is produced by two marginal circuits of which the resonance frequency is outside the desired band, and thus in such a way that their flanks are cut by the lowest or highest frequency. The tuning of the marginal circuits is shown in attached Figures 2 and 2A. Fig. 2 shows the frequency band of the television system. The left-hand curve which corresponds to the sound wave is at a carrier frequency of 45 megacycles, the right-hand curve represents the image signals. The carrier main frequency for the image signals is 47.8 megacycles. By modulation with the image signals a band width of ±2 megacycles is obtained. The range which the testing frequency passes through must comprise these two curved sections. In Fig. 2A the range is represented by the length B. In order that the testing frequency may always be in this range the marginal circuits are tuned in such a way that the frontiers of the range fall on the steepest part of the resonance curves. In the marginal circuits a voltage is generated with the amplitude A and A'. If the pass range of the testing frequency be varied, then the voltage occurring in the marginal circuits becomes either greater or less. This variation of potential A, A' is employed in order to maintain the position of the pass range and its magnitude constant.

Exact regulation is obtained if the variation of the voltage A and A' is great, upon the shifting of the testing frequency. If the marginal circuit be connected to the ultra-short wave generator, then the variation of potential at a certain frequency variation is relatively small. A greater variation is obtained if the marginal circuits are fed by the intermediate frequency. As the flanks of these circuits are much steeper in proportion to the width of a testing range the variation of potential occurring at a certain frequency variation is also substantially greater.

In Fig. 3 is shown in block diagram a system of the type described above. Test frequency generator 1, Braun tube 2, relation oscillator 3 and circuit under test 4 may correspond to those of Fig. 1. In the output of generator 1 is provided a mixing stage 5, which produces a beat frequency between the variable frequency from 1 and a fixed frequency from heterodyne oscillator 6. Between relaxation oscillator 3 and test generator 1 is provided band position regulator 7. This regulator may be considered a part of generator 1 since it serves to regulate the frequency output thereof. In order to produce the regulating action regulator 7 contains the two marginal circuits above described preferably controlled from the intermediate frequency obtained from mixing stage 5 or any subsequent intermediate frequency stage, as indicated by the dash lines.

A circuit connection which may be used for band position regulator 7 is shown in Fig. 4.

As the accuracy of regulation depends upon the slope of the resonance curve of the marginal circuits it is necessary for the attenuation to be kept as low as possible. In order to take as little power as possible from the marginal circuits they are connected in the grid circuits of an audion tube H. The regulating voltage and the reduction of the attenuation of the marginal circuit can be even further increased by a feed-back.

For the regulation of the position and width of the band a voltage of about one volt each is necessary. The accuracy of adjustment can be even further increased by making the impulses generated by the marginal circuits substantially greater, and in order to reduce the regulating voltage only the peaks of these impulses are utilised. The lower frequency marginal circuit shown to the left of Fig. 4 will first be considered. The marginal circuit consisting of $L_1$ and $C_1$ is connected in the grid circuit of the audion tube R to which intermediate frequency is also applied. The impulses of the form I and amplitude A occurring on the anode resistance $W_1$ of the tube R, Figure 5, are superposed through condenser $C_2$ upon a negative potential with respect to the cathode of rectifier G supplied through resistance $W_2$. The bias of grid $G_1$, tube H is so chosen that with the correct frequency position of the time circuit $W_3$, $C_3$ a positive bias of about half a volt in addition to the negative bias for the tube H of for example —4 volts, is obtained on the time circuit $W_3$, $C_3$, that is, the normal operative point of the tube H is at 3.5 volts. By the negative bias the flat lower portion of the impulse, which has the form of a resonance curve is rendered ineffective for the rectification. The adjustment only runs down in the steepest range of a resonance curve.

The upper frequency marginal control circuit, shown at the right of Figure 4, corresponds substantially with that just described, however, the marginal circuit $L_2$, $C_{12}$ is tuned to a frequency above the desired range corresponding to the right hand curve of Figure 2A. The intermediate frequency and the marginal circuit operated over tube $R_2$ and tube $B_2$ control the bias on grid $G_2$ of tube H. In this instance the regulation must be in the opposite direction from the lower marginal circuit and must control the bias so as to reduce amplification in H. Accordingly, the time circuit $W_{22}$, $C_{22}$ is arranged so as to increase the negative bias on grid $G_2$.

In order now, to adjust the position and scope of the range traversed by the testing frequency the tube H is used to supply the current for the premagnetisation of the high frequency iron core of the testing generator. The lower marginal regulating voltage adjusts the mean premagnetising current, the upper marginal voltage its amplitude. The premagnetising coil V is in the anode circuit of the hexode H. The mean anode current of the hexode is regulated by the grid $G_1$, which is controlled from a relaxation generator with a saw-tooth voltage, and to which the regulating potential of the marginal circuit of the lower frequency is applied. With the second control grid $G_2$ the slope of the tube, and thus the amplitude of the anode current oscillation is adjusted. The second control grid receives its potential over the other marginal circuit which is at the upper limit of the range traversed by the testing frequency. By the regulation of the mean value of the premagnetising current and its amplitude the testing frequency is then automatically regulated in such a way that it always passes through the desired frequency range.

What is claimed is:

An arrangement for producing a wide frequency band for testing purposes wherein a frequency is constantly varied for predetermined impulse periods, comprising a pair of marginal circuits, a source of intermediate frequency feeding said circuits, one of said circuits being tuned to just below the lower limit of the testing range and the other being tuned to just above the upper limit of the testing range, a relaxation oscillator, a vacuum tube, a plurality of grids therefor, a control grid of said tube connected to the output of said relaxation oscillator and to the first mentioned marginal circuit, a second grid of said tube connected to the second mentioned marginal circuit, a test frequency generator including an oscillator coil having a core of magnetic material, a polarizing winding for said core, an anode circuit for said vacuum tube including said polarizing winding, the arrangement being such that voltages from said marginal circuits are used for regulating the operating point and slope of said vacuum tube thereby regulating the current for polarizing the core of the oscillator coil to keep constant the width and position of the frequency band, a Braun tube having one set of deflector plates connected to said relaxation oscillator, and circuit means including circuits under test for connecting the opposite set of deflector plates of said Braun tube to said test frequency generator.

PETER DESERNO.